Figure 1:
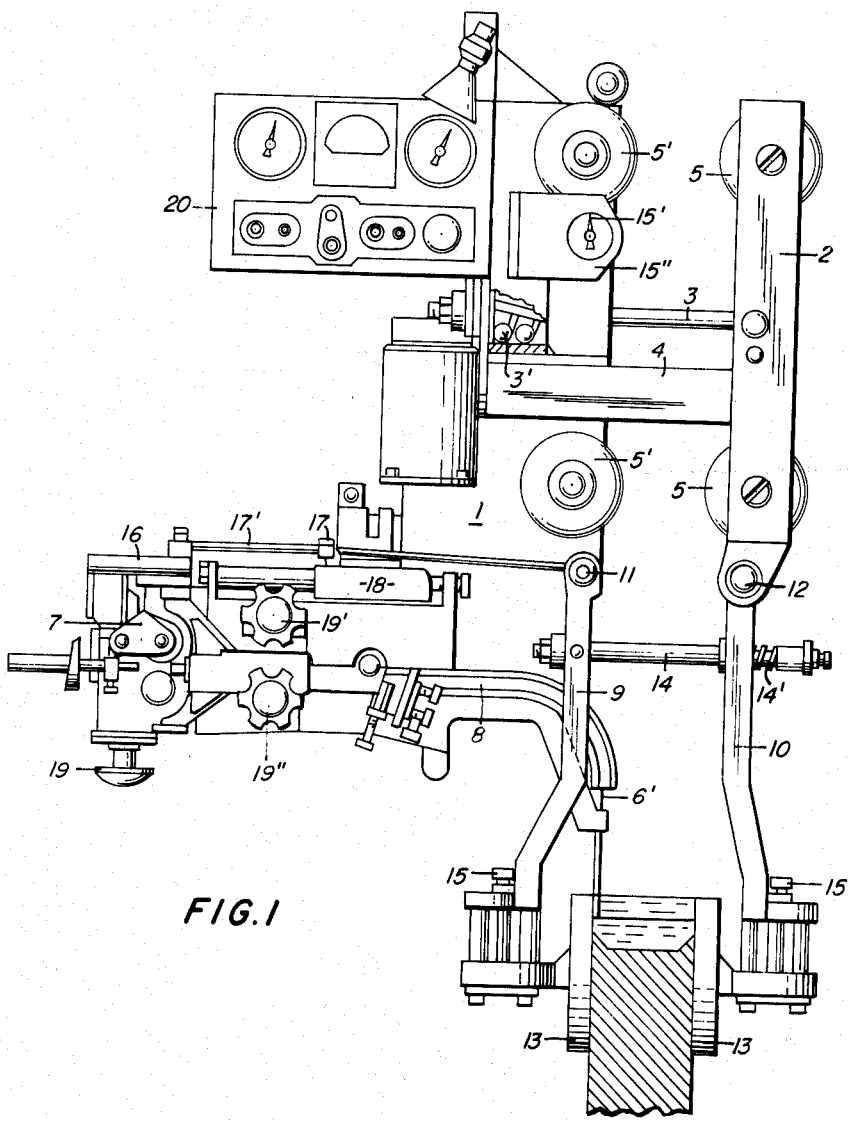
Figure 2:
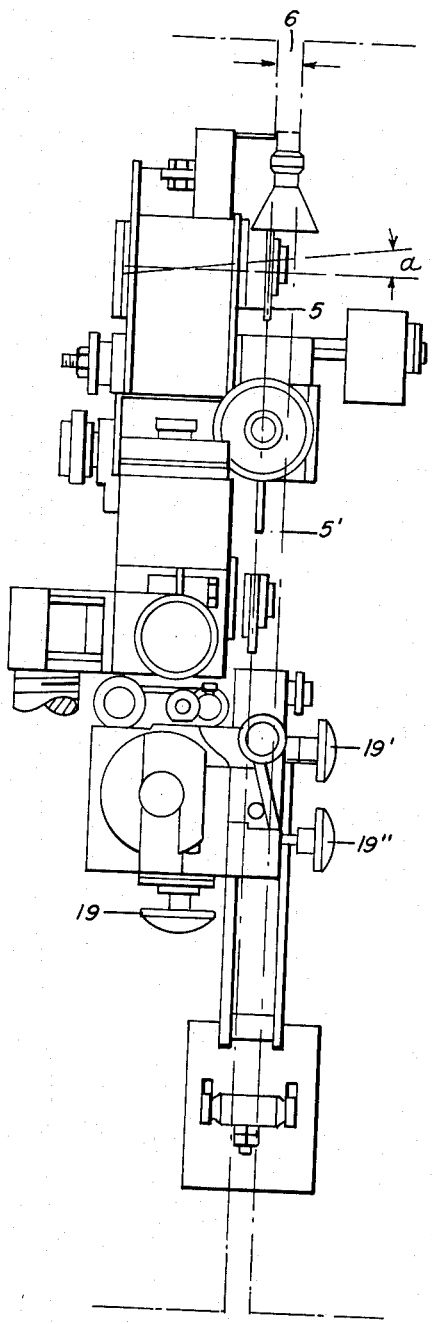
Figure 3:
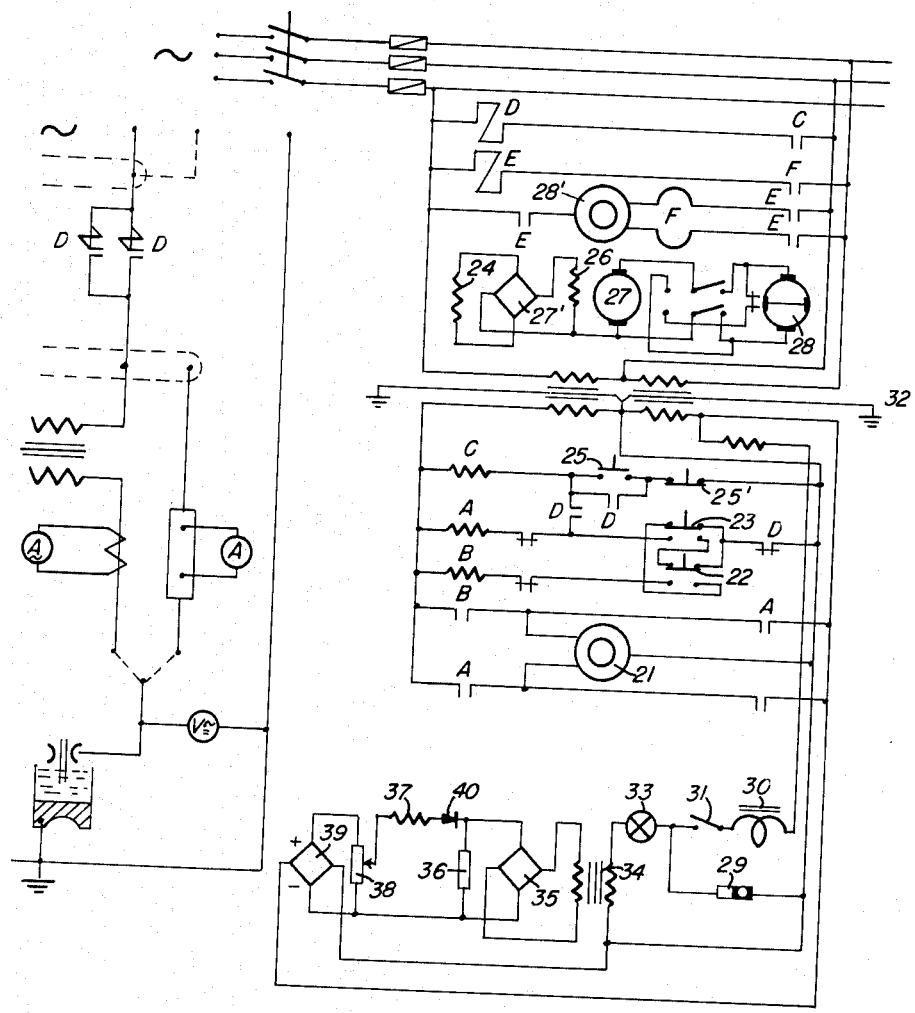

Aug. 31, 1965  D. A. DUDKO ETAL  3,204,082
DEVICE FOR ELECTRIC WELDING OF VERTICAL AND INCLINED SEAMS
Filed July 29, 1963

6 Sheets-Sheet 1

3,204,082
Patented Aug. 31, 1965

3,204,082

DEVICE FOR ELECTRIC WELDING OF VERTICAL AND INCLINED SEAMS

Daniil Andreevich Dudko, Roman Mikhailovich Gordon, Oskar Osipovich Rozenberg, and Meilikh Gdal-Gershovich Beljfor, all of Kiev, U.S.S.R., assignors to Institute Elektrosvarki "E. O. Paton"

Filed July 29, 1963, Ser. No. 298,061
7 Claims. (Cl. 219—126)

The present invention relates to means for the electric welding of metals and more particularly to means for welding vertical seams of great length.

It is well known that rail-less welding devices travel directly upon the work and do not require any special rail guides and supporting structures for their operation. Devices of such a type are usually made up of two carriages. These carriages are positioned at both sides of the work being welded, linked by means of a spring-mounted rod, furnished with support and guide rollers and with a driving mechanism for moving the same along the work. The guide rollers have flanged rims that enter the gap between the edges being welded, with the carriages, supporting the electrode feed mechanism, the electrode oscillation mechanism and the forming shoes covering the gap of the welded edges in the welding zone.

There exist several types of such welding devices, for examples, those designed by the Paton Electric Welding Institute of the Urkainian S.S.R. However, these devices have the following essential shortcomings:

(a) Are of considerable weight;
(b) Are difficult to mount on the work;
(c) Afford limited control during the process of welding; and
(d) Do not allow the welding of curved and inclined seams.

The object of the present invention is to permit the welding of inclined seams as well as curved seams.

Another object of this invention is to simplify the assembling of the device.

Another object of the invention is to ensure reliable copying of the edge of the work by the flanged rims of the guide rollers.

Among other objects and advantages of the invention is to provide a device by which maintenance is simplified in that the device is easily and readily disassembled.

Other objects and advantages of the invention will become more readily apparent to persons skilled in the art from the following description and accompanying drawings:

FIG. 1 is an elevational view of a welding device according to the present invention.

FIG. 2 is an end elevational view with certain parts in cross-section of the device shown in FIG. 1.

FIG. 3 is a diagrammatic view of the electric circuit.

FIG. 4*a* is a view of the driving carriage.

FIG. 4*b* is a view of the rear idler carriage.

FIG. 4*c* is a view of the feed mechanism.

FIG. 4*d* is a view of the control desk.

FIG. 5 is a view similar to FIG. 1 showing the position of the device during welding of an inclined seam, and FIG. 6 is a view similar to FIG. 1 showing the position of the device during welding of a curved seam.

As shown in FIGS. 1 and 2, a front driving carriage 1 is operably connected to a rear idler carriage 2 by a rod 3 which passes through the gap between the edge of the work being welded and by a strap 4. The rod 3 is provided with a spring 3' for pressing the work to the carriages 1 and 2. The carriage 2 is equipped with support rollers 5 and guide rollers 5' for the carriage I have a profiled surface for proper engagement with the work and uniform travel of the carriage 1 during the process of welding. The guide rollers 5' of carriage 1 and the support rollers 5 of the carriage 2 are provided with flanged rims that are introduced into gap 6 between the edges being welded (see FIG. 2).

An electrode wire (electrode) 6' is fed to the welding zone by a feed mechanism 7 through a neck 8 which also serves for supplying the welding current to the electrode 6'. Water-cooled copper slide blocks or forming shoes 13 are suspended from the carriages 1 and 2, respectively, by means of rods 9 and 10 attached by connections 11 and 12. The rods 9 and 10 are interconnected by means of a rod 14 provided with spring 14' passed through the gap 6. The position of the forming shoes 13 with respect to the device can be adjusted by means of screws 15, and this arrangement is of special importance when welding inclined and curved seams. Such adjustment can be effected with the welding device either in operation or at a standstill. In order to ensure reliable copying of one of the welded edges, the shafts of the guide rollers 5' are set at an angle $\alpha=1°-1.5°$ to the horizontal and as a result, the device is pressed to the left edge of the work during the welding process.

The carriages 1 and 2 move upwardly along the work as the seam is produced at a speed sufficient for forming the seam and maintaining a constant depth of the slag bath. The electrical circuit of the device allows automatic speed control of the carriages 1 and 2.

As the speed of vertical travel is small (0.5–2.5 meters per hour), the device is provided with a travel indicator 15' and driving roller 15'' thereof is pressed to the work by a spring (not shown in FIG. 1) and turns an indicating pointer when the device is moved.

The feed mechanism 7 feeds the electrode 6' and oscillates the same along the welding bath. The electrodes 6' are oscillated by means of an adjustable crank-rod mechanism provided for the feed mechanism 7 and a connection 17 a rod 17' is fixed to the carriage 1. The feed mechanism 7 and neck 8 are shifted with respect to the carriage 1 along tubular guides 18. The crank-rod mechanism assures uniform melting of the edges due to a sinusoidal variation of the rate of oscillation of the electrode 6'. This rate is minimum at the forming shoes 13, where the dissipation of heat is more intensive, and is maximum at the middle of the weld, where the heat dissipation is less intensive. Upon necessity, the electrode oscillating mechanism can be disengaged by means of handle 19 of a friction clutch. In this case, welding is carried out with the electrode 6' stationary. The device is equipped with transverse and lateral correctors 19' and 19'', respectively, for adjusting the position of the neck 8 and electrode 6' during operation. The device is controlled from a control desk 20.

As illustrated in FIG. 3, "up" and "down" buttons 22 and 23 serve for controlling electric motor 21 of the electrode feeding and oscillating mechanism during subsidiary operations such as short circuiting of the electrode, raising the electrode from the melted flux, et cetera. When the button 23 is pressed, relay A is energized and closes its normally-open contacts inserted into the circuit of the electric motor 21. As a result, the wire 6' is fed downwardly. When the button 22 is pressed, the coil of relay B is energized, the normally-closed contacts inserted into the circuit of the electric motor 21 are opened and the wire 6' is fed upwardly. The relay A has normally-closed contacts A' in the circuit of the coil of the relay B, and the latter has normally-closed contacts in the circuit of the coil of the relay B. These contacts serve for preventing simultaneous operation of the relays A and B, as this may cause a short circuit in the 36 v. circuit of a step-down transformer 24.

Prior to welding, the electrode wire 6' is short-circuited with the work through metal cuttings. Welding is initiated by pressing button 25 and is stopped by pressing button 25'. When button 25 is pressed, an auxiliary relay C is energized and closes its contacts inserted into the circuit of the coil of a contactor D. The latter makes the welding circuit, closes its normally-open contacts D' in the circuit of the relay A, and opens its normally-closed contacts D" in the circuit of buttons 22 and 23. The electric motor 21 feeds wire 6' to the welding zone.

Field winding 26 of a vertical travel motor 27 is supplied by the transformer 24 through a selenium rectifier 27' and its armature winding is supplied by a generator 28 of a rotary amplifier 28-28'. The speed of the device's vertical travel varies automatically with the depth of the metal bath during the process of welding. This is achieved by means of a sensitive element such as a gauge 29 which is mounted on the front slide. The voltage of a step-down transformer 32 is brought up to the gauge 29 and the frame through a choke coil 30 and a switch 31. A flow of current is set up between the gauge 29 and the metal bath due to the conductance of the melted flux. The voltage drop across the slag-filled space between the gauge 29 and the metal bath depends upon and is directly proportional to the distance between the same. The voltage at the gauge 29 is supplied to a resistor 36 through a lamp 33, a step-up transformer 34 and a selenium rectifier 35. Field or winding 37 of the generator 28 feeding the armature of the motor 26 is supplied at a voltage resulting from the comparison of two quantities, namely, voltage across potentiometer 38 (supplied by the step down transformer 32 through a selenium rectifier 39) and the voltage across the resistor 36.

The field winding 37 is connected in series with a germanium rectifier 40 that provides a flow of current through the winding 37 when the voltage across the potentiometer 38 exceeds that across the resistor 36, and cuts off the current flowing through the field winding 37 when the voltage across the resistor 36 exceeds that across the potentiometer 38.

At a small distance between the gauge 29 and the metal bath, the voltage drop across the gauge 29 is practically zero. As a result, a flow of current is set up through the winding 37 and the device is quickly moved upwardly. This increases the distance between the gauge 29 and the metal bath and consequently increases the voltage drop across the gauge 29 thereby decreasing the field winding 27 current. Due to this, the speed of travel of the device is correspondingly lessened. At an excessive distance between the gauge 29 and the metal bath, the voltage across the resistor 36 exceeds that across the potentiometer 38. In order to avoid the reversing of the motor 26, the germanium rectifier 40 is inserted into the circuit of the field winding 37 of the generator 28. The choke coil 30 is connected to the supply circuit of the gauge 29 in order to limit the short circuit current when the gauge 29 comes into contact with the metal bath.

Installation of the device on the work is relatively easy, as the device is made up of individual units each having a weight not greater than 20 kgs.

Figure 4:
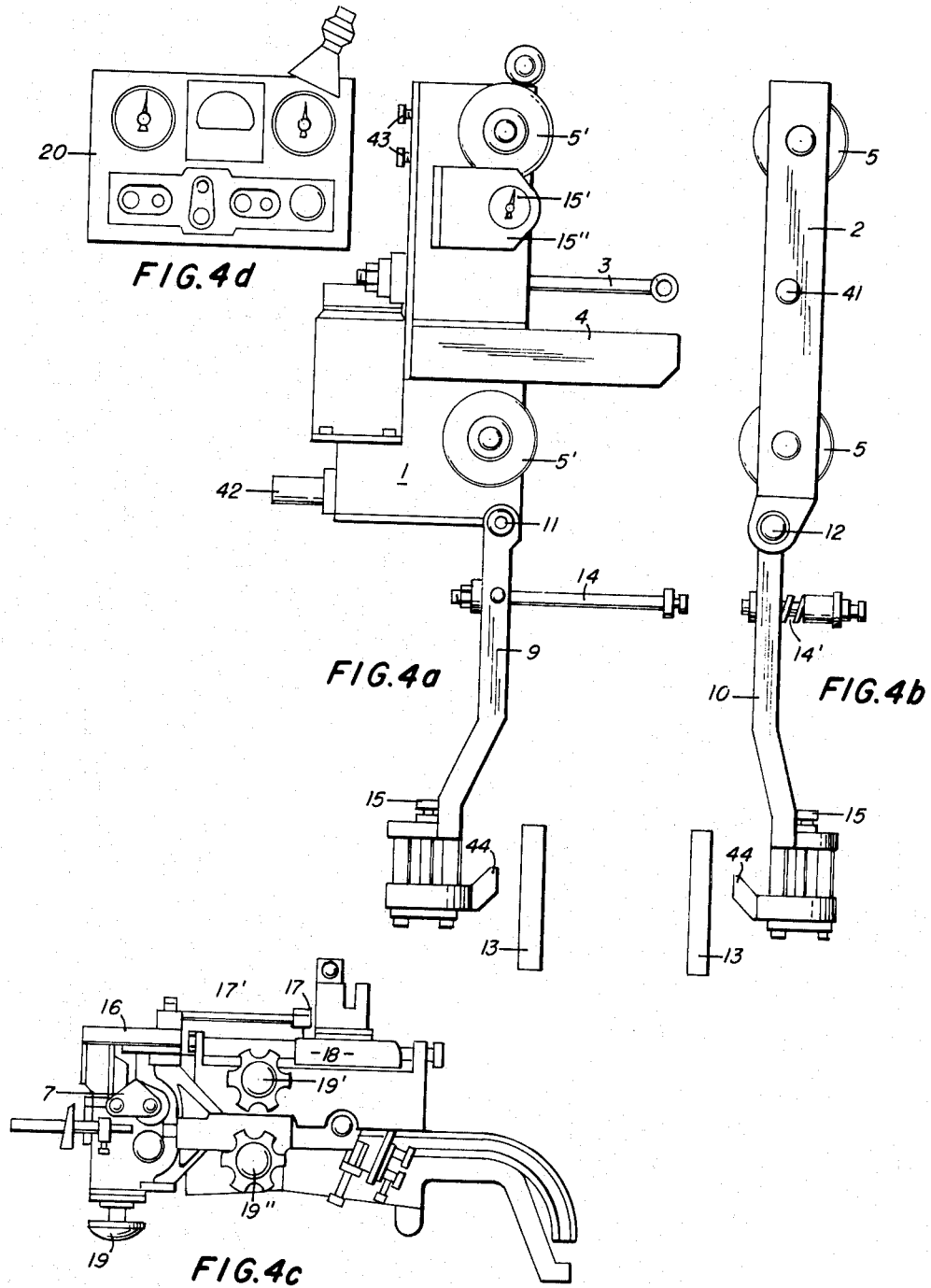

In FIG. 4a it can be seen that the rod 3 is coupled with the carriage by means of a pin 41 (FIG. 4b). A pin 42 serves for linking the feed mechanism 7 and the carriage 1 (FIG. 4c). The control disk 20 (FIG. 4d) is secured to the carriage 1 by a pin 43 and the forming shoes 13 are set upon knives 44 as illustrated in FIGS. 4a and 4b. In order to facilitate assembly, the rod 14 is provided with stops 45 for maintaining the springs 14' in a compressed condition (FIGS. 4a and 4b).

Figure 5:
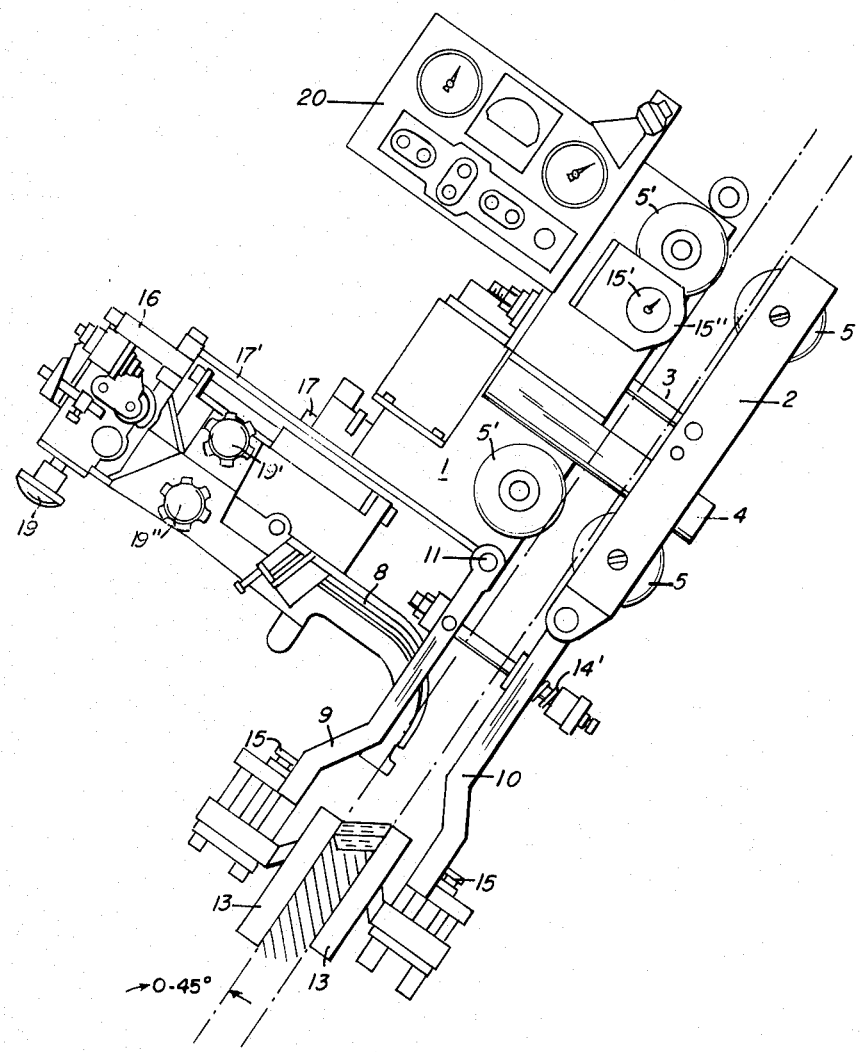
Figure 6:
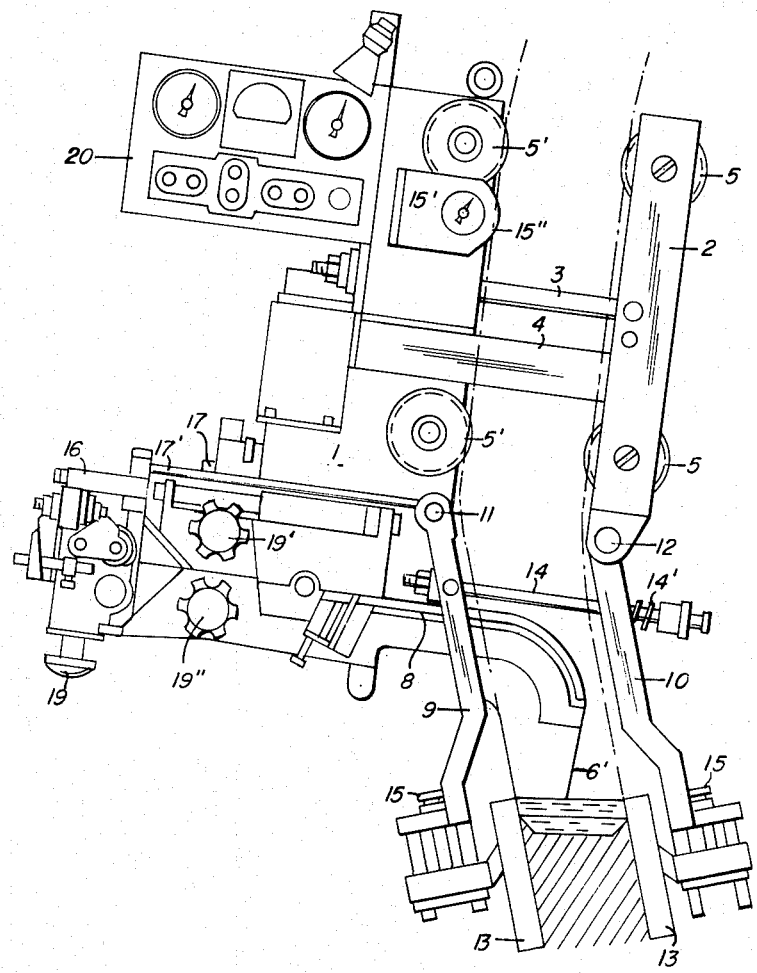

As previously stated, the rods 9 and 10 are linked with the carriages 1 and 2 by connections 11 and 12 and such an attachment of the rods 9 and 10 enables the welding of inclined seams and curved seams as disclosed in FIGS. 5 and 6, respectively.

The invention is not to be confined to any strict conformity to the showings in the drawings but changes or modifications may be made therein so long as such changes or modifications mark no material departure from the spirit and scope of the appended claims.

What we claim is:

1. A device for the electric flux welding of vertical and inclined seams in metal work comprising driving and idler carriages adapted to be positioned at both sides of the work, a spring-mounted rod coupling the driving and idler carriages passing through the gap between the edges being welded, support rollers mounted on the idler carriage, guide rollers mounted on the driving carriage, forming shoes located on said driving and idler carriages, an electrode feed mechanism carried by the driving carriage, an electric oscillating mechanism, said electrode oscillating mechanism and the electrode feed mechanism being mounted on the driving and idler carriages, rods for coupling the forming shoes with the driving and idler carriages, and a spring-mounted rod coupling the rods passed through the gap between the edges being welded.

2. A device for the electric flux welding of vertical and inclined seams in metal work, comprising driving and idler carriages adapted to be positioned at both sides of the work, a spring-mounted rod coupling the driving and idler carriages passing through the gap between the edges being welded, support rollers mounted on the idler carriage, guide rollers mounted on the driving carriage, an electrode feed mechanism carried on the driving carriage, an electrode oscillating mechanism, said electrode oscillating mechanism and the electrode feed mechanism being mounted on the driving carriage, forming shoes covering the gap between the edges being welded in the welding zone, rods coupling the forming shoes with the driving and idler carriages, a spring-mounted rod linking the rods and stops on said last-named rod for maintaining the spring on the rod in a compressed condition.

3. A device for the electric flux welding of vertical and inclined seams in metal work comprising driving and idler carriages adapted to be positioned at both sides of the work, a spring-mounted rod coupling the driving and idler carriages passing through the gap between the edges being welded, support rollers mounted on the idler carriage, guide rollers mounted on the driving carriage, an electrode feed mechanism carried on the driving carriage, an electrode oscillating mechanism, said electrode oscillating mechanism and the electrode feed mechanism being mounted on the driving carriage, forming shoes located on the driving and idler carriages, rods, connection means operably coupled to said last-named rods linking the forming shoes with the driving and idler carriages, and a spring-mounted rod for linking the last-named rods.

4. A device for the electric flux welding of vertical and inclined seams in metal work, comprising driving and idler carriages adapted to be positioned at both sides of the work, a spring-mounted rod coupling the driving and idler carriages passing through the gap between the edges being welded, an electric motor for moving the driving and idler carriages vertically relative to the work, support rollers mounted on the idler carriage, guide rollers, means mounting the guide rollers on the driving carriage at an angle to the direction of movement, an electrode feed mechanism carried by the driving carriage, an electrode oscillation mechanism, said electrode oscillating mechanism and electrode feed mechanism being mounted on the driving carriage, forming shoes located on the driving and idler carriages, rods linking the forming shoes with the driving and idler carriages, and a spring-mounted rod for coupling the last mentioned rods.

5. A device for the electric flux welding of vertical and inclined seams on metal work, comprising driving and idler carriages adapted to be positioned at both sides of the work, a spring-mounted rod coupling the driving and idler carriages passing through the gap between the edges being welded, support and guide rollers, each of said rollers being provided with flanged rims for entering the gap between the edges being welded, an electrode feed mechanism carried by the driving carriage, an electrode oscillation mechanism, said electrode oscillating mechanism and the electrode feed mechanism being mounted on the driving carriage, forming shoes located on the driving and idler carriages, rods coupling the forming shoes with the driving and idler carriages, and a spring-mounted rod linking the last mentioned rods.

6. A device for the electric flux welding of vertical and inclined seams on metal work, comprising driving and idler carriages adapted to the positioned at both sides of the work, a spring-mounted rod coupling the driving and idler carriages passing through the gap between the edges being welded, support rollers mounted on the idler carriage, guide rollers mounted on the driving carriage, and electrode feed mechanism carried by the driving carriage, an electrode oscillation mechanism, said electrode oscillating mechanism and the electrode feed mechanism being mounted on the driving carriage, a common electric motor for controlling the electrode feed mechanism and electrode oscillation mechanism, forming shoes located on the driving and idler carriages, rods for coupling the forming shoes with the driving and idler carriages, and a spring-mounted rod for linking the last mentioned rods.

7. A device for the electric flux welding of vertical and inclined seams on metal work, comprising driving and idler carriages adapted to be positioned at both sides for the work, a spring-mounted rod coupling the driving and idler carriages passing through the gap between the edges being welded, support rollers mounted on the idler carriage, guide rollers mounted on the driving carriage, an electrode feed mechanism carried by the driving carriage and including a neck, an electrode oscillation mechanism, said electrode oscillating mechanism and the electrode feed mechanism being mounted on the driving carriage and provided with transverse and lateral correcting means for adjusting the position of the neck and electrode during a welding operation, forming shoes located on the driving and idler carriages, rods coupling the forming shoes with the driving and idler carriages, and a spring-mounted rod for linking the last mentioned rods.

References Cited by the Examiner

UNITED STATES PATENTS

| | | | |
|---|---|---|---|
| 2,737,565 | 3/56 | Meyer | 219—126 |
| 2,817,748 | 12/57 | Meyer | 219—126 |
| 2,997,571 | 8/61 | Smout | 219—126 |
| 3,040,166 | 6/62 | Kriewith et al. | 219—126 |

FOREIGN PATENTS 1,254,428  1/61  France.

RICHARD M. WOOD, *Primary Examiner.*